(12) United States Patent
Hsieh et al.

(10) Patent No.: US 8,510,694 B2
(45) Date of Patent: Aug. 13, 2013

(54) TRANSACTION LEVEL SYSTEM POWER ESTIMATION METHOD AND SYSTEM

(75) Inventors: Wen-Tsan Hsieh, Kaohsiung (TW); Jen-Chieh Yeh, Hsinchu (TW); Hong-Jie Huang, Tainan (TW); I-Yao Chuang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 144 days.

(21) Appl. No.: 13/041,443

(22) Filed: Mar. 7, 2011

(65) Prior Publication Data

US 2012/0144216 A1 Jun. 7, 2012

(30) Foreign Application Priority Data

Dec. 6, 2010 (TW) ................................. 99142387 A

(51) Int. Cl.
  *G06F 17/50* (2006.01)
(52) U.S. Cl.
  CPC .......... *G06F 17/5022* (2013.01); *G06F 17/504* (2013.01); *G06F 17/505* (2013.01)
  USPC ........... 716/109; 716/111; 716/120; 716/127; 716/133; 703/18; 703/29; 703/16
(58) Field of Classification Search
  CPC .. G06F 17/5022; G06F 17/504; G06F 17/505
  USPC .......... 716/109, 111, 120, 127, 133; 703/18, 703/29, 16
  See application file for complete search history.

(56) References Cited

U.S. PATENT DOCUMENTS

| | | | |
|---|---|---|---|
| 5,481,484 A * | 1/1996 | Ogawa et al. | 703/14 |
| 6,735,744 B2 | 5/2004 | Raghunathan et al. | |
| 6,865,526 B1 | 3/2005 | Henkel et al. | |
| 7,051,300 B1 | 5/2006 | Shen et al. | |
| 7,143,368 B1 | 11/2006 | Plofsky et al. | |
| 2002/0004927 A1* | 1/2002 | Takahashi et al. | 716/2 |
| 2005/0204316 A1* | 9/2005 | Nebel et al. | 716/2 |
| 2005/0223344 A1 | 10/2005 | Sato et al. | |
| 2006/0080076 A1 | 4/2006 | Lahiri et al. | |
| 2007/0220292 A1 | 9/2007 | Ishihara et al. | |
| 2007/0276645 A1 | 11/2007 | Veller et al. | |
| 2009/0112550 A1* | 4/2009 | Aikawa et al. | 703/14 |
| 2010/0251193 A1* | 9/2010 | Oishi et al. | 716/5 |
| 2011/0035203 A1* | 2/2011 | Dalton et al. | 703/14 |

(Continued)

OTHER PUBLICATIONS

Bansal et al.,"Power Monitors: A Framework for System-Level Power Estimation Using Heterogeneous Power Models," 18th International Conference on VLSI Design, Jan. 2005, 7 pages.

(Continued)

*Primary Examiner* — Phallaka Kik
(74) *Attorney, Agent, or Firm* — Jianq Chyun IP Office

(57) ABSTRACT

A transaction level (TL) system power estimation method and system are provided. The method includes inserting at least a characteristic extractor into an electronic device of a target system. The characteristic extractor extracts at least a power characteristic of the electronic device when a TL simulation is proceeding. The power characteristic provided from the characteristic extractor is converted to at least a power consumption value by using a power model. The power consumption value is recorded into a power database, for analyzing power consumption of the whole target system. In some embodiments, the TL system power estimation method and system can be applied in the target system with dynamic power management. The TL system power estimation method and system also can be used with a high-level synthesizer to develop the power-aware electronic device in a short time.

30 Claims, 6 Drawing Sheets

(56) References Cited

U.S. PATENT DOCUMENTS

2012/0131523 A1* 5/2012 Lu et al. .................. 716/102

OTHER PUBLICATIONS

Lee et al., "PowerViP: SoC Power Estimation Framework at Transaction Level," Proceedings of the 2006 Asia and South Pacific Design Automation Conference, 2006, pp. 551-558.

Conti et al., "Extension of SystemC framework towards power analysis," Forum on Specification & Design Languages, Sep. 22-24, 2009. ACM SIGARCH Computer Architecture News, vol. 33, No. 4, Sep. 2009, 4 pages.

Ahuja et al., "Power Estimation Methodology for a High-Level Synthesis Framework," Quality of Electronic Design, 2009. IEEE ISQED 2009, pp. 541-546, Mar. 16-18, 2009.

* cited by examiner

TRANSACTION LEVEL SYSTEM POWER ESTIMATION METHOD AND SYSTEM

CROSS-REFERENCE TO RELATED APPLICATION

This application claims the priority benefit of Taiwan application serial No. 99142387, filed on Dec. 6, 2010. The entirety of the above-mentioned patent application is hereby incorporated by reference herein and made a part of this specification.

TECHNICAL FIELD

The disclosure relates to a power estimation technique, and in particularly to a transaction level (TL) system power estimation method and system and a characteristic extractor inserting method thereof.

BACKGROUND

With the significant growth of the hardware and software design complexity, the modern SoC development cycle is also greatly increased. Using the traditional register transfer level (RTL) design methodology is too time-consuming especially for the modern SoC design which needs a high integration of software and hardware. Therefore, it has become the inevitable trend to adopt the electronic system level (ESL) design methodology to improve the productivity of modern system design. To further reuse the developed ESL model, a high-level synthesis tool is widely used to change the ESL model into the RTL.

Power consumption has always been a crucial problem of a chip due to the increasing hardware complexity and operating frequency. Currently, many researches point out that the minimizing power consumption in ESL can have better power gain than in the RTL or gate level. According to the report of the International Technology Roadmap for Semiconductor (ITRS) in 2009, 50% power saving will be achieved in ESL in 2011; and it will go up to 80% in 2015 while we minimizing power consumption in ESL. In the ESL, the transaction level (TL) has the widest range of application. Therefore, it is necessary to estimate the power in an earlier stage of design and at a higher design level—transaction level.

However, in the prior arts, there are many difficulties for the transaction level used in estimating the power consumption, and among others, the major reason is the lack of a mature solution. Designers should spend extra time to add the function for reflecting the power consumption on the high-level design mode. Moreover, although some electronic design automation (EDA) manufacturers have developed the tool for the TL used in estimating the power consumption, the RTL power engine is still used. The prior arts do not incorporate the high-level synthesis technique to automatically generate the model with the power consumption information capability, and are difficult to be applied in the electronic device under development. Based on the above circumstances, it is difficult for the designers to make estimation and analysis of the power consumption from the high-level TL in the early stage of design.

SUMMARY

The disclosure provides a transaction level (TL) system power estimation method and system, which realizes the high-level power estimation in the design stage of the electronic system level, thereby effectively reducing the development cycle of the system software and hardware and increasing the Time-to-Market benefits of the products.

The disclosure provides a characteristic extractor inserting method, for inserting a characteristic extractor into an electronic device of a target system. Therefore, when the target system is proceeding the TL simulation, the characteristic extractor can extract a power characteristic of the electronic device.

According to an embodiment of the disclosure, a transaction level (TL) system power estimation method is provided, which includes the following steps. At least a characteristic extractor is inserted into at least an electronic device of a target system. The at least a characteristic extractor extracts at least a power characteristic of the electronic device when the TL simulation of the target system is performing. A power model is provided. The at least a power characteristic provided from the at least a characteristic extractor is converted to at least a power consumption value by using the power model. The at least a power consumption value is recorded into a power database.

According to an embodiment of the disclosure, a computer readable recording medium is provided, for storing a program that executes the above TL system power estimation method.

According to an embodiment of the disclosure, a system power estimation system is provided, which includes at least a characteristic extractor, a simulation platform, a power model, a power database generator and a power database. The at least a characteristic extractor is inserted into an electronic device of a target system. The simulation platform performs a TL simulation of the target system. The at least a characteristic extractor extracts at least a power characteristic of the electronic device when the TL simulation is proceeding. The power model records the power consumption model of the electronic device. The power database generator converts the at least a power characteristic provided from the at least a characteristic extractor to at least a power consumption value by using the power model. The power database records the at least a power consumption value output by the power database generator.

According to an embodiment of the disclosure, a characteristic extractor inserting method is provided, which includes parsing a transaction level model (TLM) of an electronic device of a target system to find out a branch path of an operation status of the electronic device; and inserting at least a characteristic extractor into the branch path.

According to an embodiment of the disclosure, a computer readable recording medium is provided, for storing a program that executes the above characteristic extractor inserting method.

Based on the above description, in the embodiments of the disclosure, the characteristic extractor is inserted into an electronic device of a target system, so that the characteristic extractor can extract a power characteristic of the electronic device when the target system is proceeding the TL simulation. The power database generator converts the power characteristic output by the characteristic extractor in the TL simulation process to the power consumption value by using a corresponding power model of the electronic device, for analyzing the power consumption of the whole target system. Therefore, the high-level power estimation is realized in the design stage of the ESL, thereby effectively reducing the development cycle of the system software and hardware and increasing the Time-to-Market benefits of the products.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

The electronic system level (ESL) design method shows the evidence of effectively reducing the development cycle of the system software and hardware and increasing the Time-to-Market benefits of the products. The TL simulation of the system under development (hereinafter referred to as the target system) can be proceed by using a simulation platform. The simulation platform may be a computer platform that runs electronic design automation (EDA) software and may also be another simulation platform with the TL simulation capability. Along with the increasing complexity of the system design, the problem of power consumption becomes more important, and designers needs making necessary consideration and plan of the problem of power consumption in the early stage of design. However, the ESL power estimation method in the prior arts is still immature. In the following embodiment of the disclosure, a system power estimation infrastructure is provided to convert a virtual electronic device of an original system design into an electronic device with a high-level power estimation capability.

Figure 1:
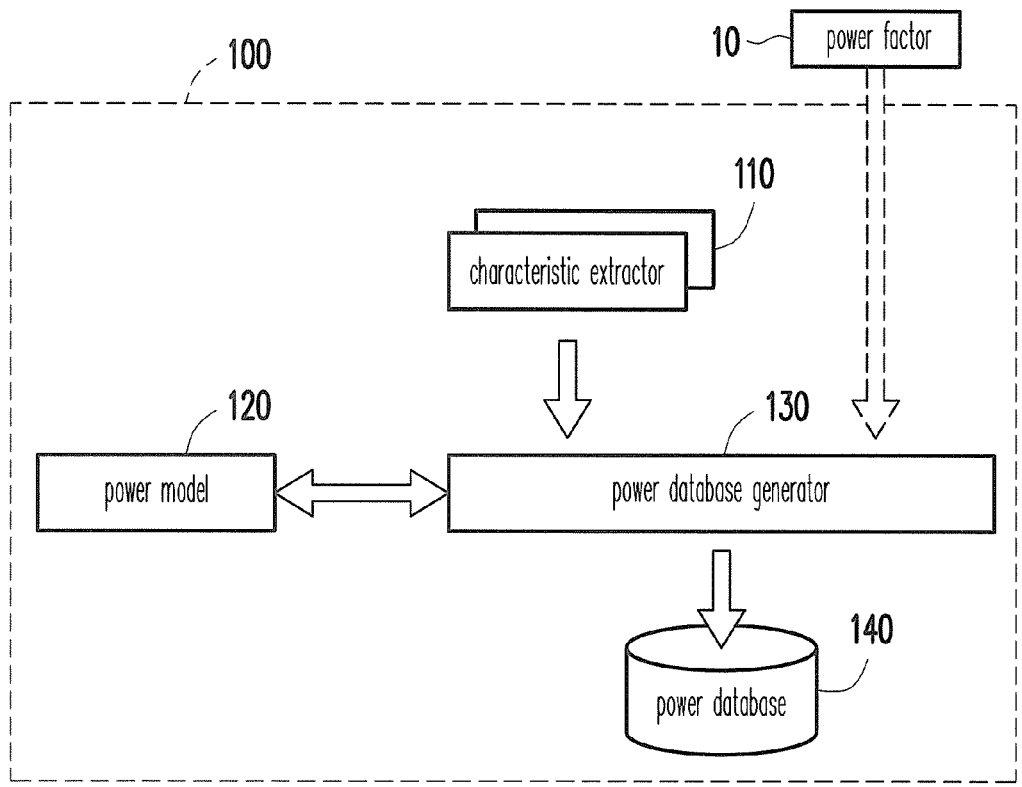
FIG. 1 is a schematic block view illustrating functions of a system power estimation system according to an embodiment of the disclosure.

FIG. 1 is a schematic block view illustrating functions of a system power estimation system according to an embodiment of the disclosure. The system power estimation system includes a simulation platform and a system power estimation infrastructure 100. The system power estimation infrastructure 100 includes at least a characteristic extractor 110, a power model 120, a power database generator 130 and a power database 140.

Figure 2A:
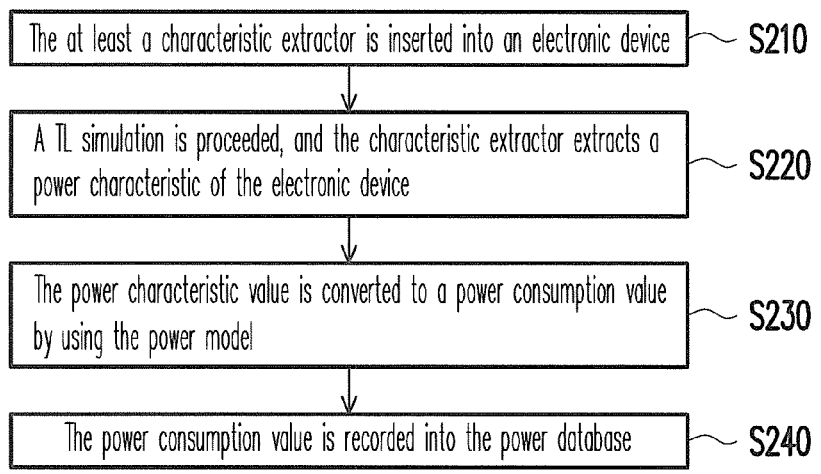
FIG. 2A is a schematic flow chart illustrating a TL system power estimation method according to an embodiment of the disclosure.

FIG. 2A is a schematic flow chart illustrating a TL system power estimation method according to an embodiment of the disclosure. Referring to FIG. 1 and FIG. 2A, in step S210, the at least a characteristic extractor 110 is inserted into at least one electronic device of the target system. In step S210, the characteristic extractor 110 inserting method is proceeded, in which the transaction level model (TLM) of the electronic device of the target system is parsed, and then according to preset inserting constraints (e.g. the amount of the inserted characteristic extractor 110 set in advance) appropriate inserting positions are found in the electronic device, and then the characteristic extractor 110 is inserted in the electronic device. For example, in step S210 a TLM of the electronic device is parsed to obtain a control data flow graph (CDFG), then a branch path of an operation status of the electronic device is found from the CDFG, and then the characteristic extractor 110 is inserted into the branch path.

A TL simulation of the target system is performed on the simulation platform (step S220). The at least a characteristic extractor 110 extracts at least a power characteristic of the electronic device during the TL simulation, and transfers the at least a power characteristic to the power database generator 130. The at least a power characteristic includes a time stamp and/or a status information.

The power model 120 records the high-level power consumption model of the electronic device. For example, the power model 120 records and provides a coefficient value (such as a dynamic power coefficient or other coefficient values) and/or a calculation formula for calculating the power consumption value of the electronic device. Also, for example, the power model 120 records power information (such as a static power value, a dynamic power value or other power information) of the electronic device under different operating status. The user may input the power information into the power model 120 according to the specification of the electronic device or may manually set the power information of the power model 120 or input the simulated power information to the power model provided here in the conventional low-level abstract level simulation manner. The low-level abstract level simulation is for example a power simulation of a register transfer level (RTL), a gate level and a transistor level etc.

Figure 2B:
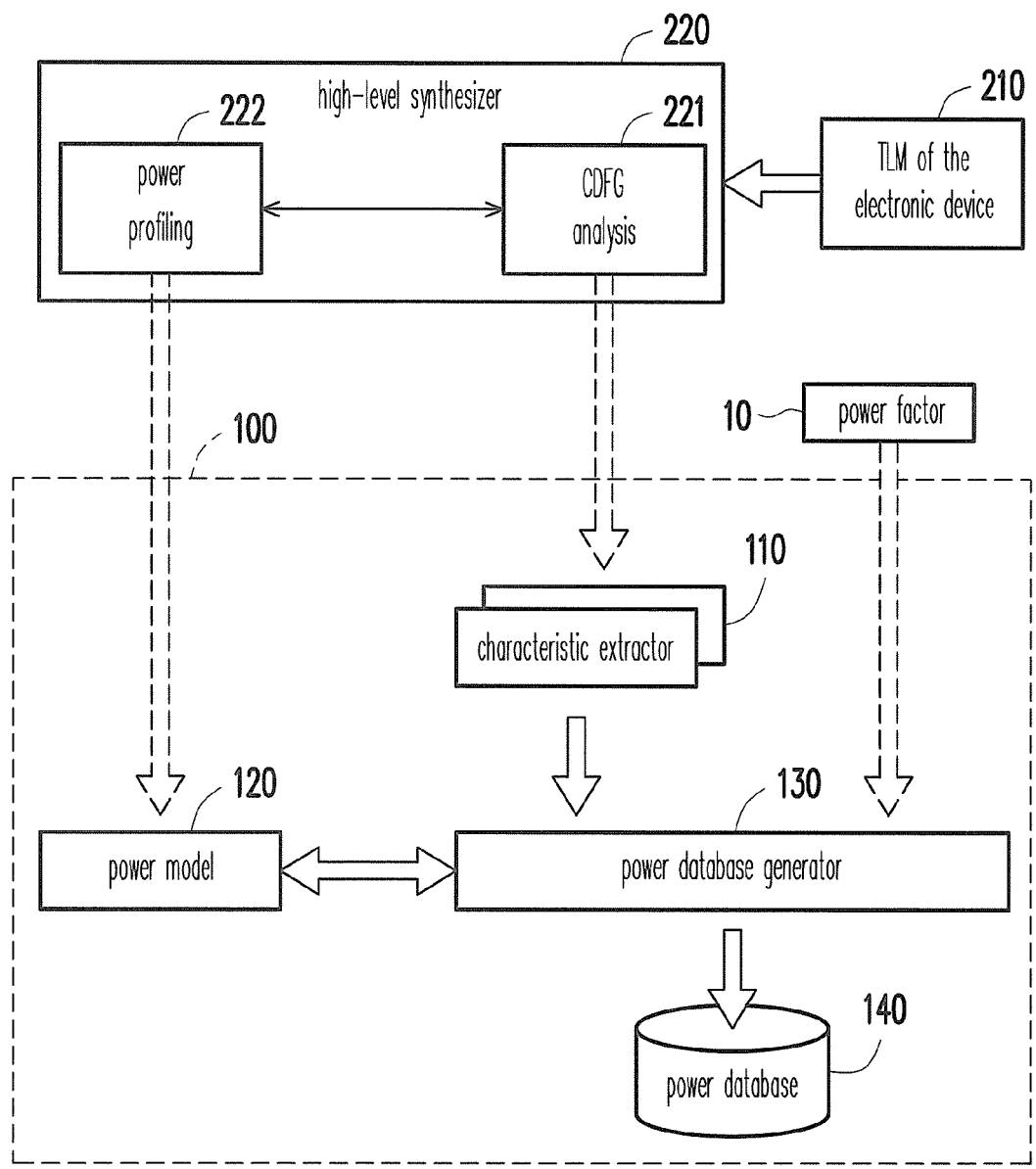
FIG. 2B is a schematic view illustrating the use of the high-level synthesis to generate a power model in FIG. 1 according to an embodiment of the disclosure.

In the embodiment where the high-level synthesizer is used, the high-level synthesizer may be used to produce the power model 120, so the design model under the TL development may have the reliable power model 120 for analysis and use without waiting for creating the power model until the model design is proceeding to the RTL or gate level, which indeed realizing the concept of the top-down design flow. For example, FIG. 2B is a schematic view illustrating the use of the high-level synthesis to generate a power model in FIG. 1 according to an embodiment of the disclosure. The high-level synthesizer 220 may be any high-level synthesis tool software that is well known in this field currently or in future. The high-level synthesizer 220 may parse/synthesize the TLM 210 of the electronic device of the target system. Generally speaking, the high-level synthesizer 220 has a CDFG analysis function 221 and a power profiling function 222. The function 221 and the function 222 are the well known techniques in this field, and the details will not be repeated herein again.

The CDFG analysis function 221 may parse a TLM 210 of the electronic device to obtain a CDFG. Then, the CDFG analysis function 221 may proceed the characteristic extractor 110 inserting method (e.g. the aforementioned step S210) illustrated in the embodiments of the disclosure, for finding out a branch path of the operation status of the TLM 210 from the CDFG and automatically inserting the characteristic extractor 110 into the branch path.

The power profiling function 222 may synthesize the TLM 210 into a low-level model and then obtain the power information of partial or all branch paths of the CDFG based on an analysis result of the CDFG analysis function 221 in a low-level simulation manner. The power profiling function 222 creates the power model 120 by using the power information of partial or all branch paths of the CDFG based on the simulation requirement of the user. Therefore, the power profiling function 222 realizes the top-down power model creation. Since the power profiling function 222 obtains the power information of the power model 120 in a low-level simulation manner, a high accuracy high-level power estimation may be realized in the design stage of the ESL.

Referring to FIG. 1 and FIG. 2A, in step S230, the power database generator 130 converts the at least a power characteristic provided from the at least a characteristic extractor 110 to at least a power consumption value by using the power model 120. Then, the power database generator 130 records the at least a power consumption value and the corresponding time stamp into the power database 140 (step S240), for the power analyzing of the whole target system. The power consumption value may include a dynamic power consumption value and/or a static power consumption value.

In other embodiments, if the target system has the dynamic power management (DPM) function, the power database generator 130 may receive an additional power factor 10 from the DPM controller, the power management unit (PMU) and/or other control circuits of the target system. The power factor 10 may be an operating voltage, a clock frequency and/or a DPM status of the electronic device. The DPM status which may include power gating, clock gating and/or a sleeping mode. The power database generator 130 converts the power characteristic provided from characteristic extractor 110 to the power consumption value by using the power factor 10 and power model 120 and records the power consumption value and the corresponding time stamp into the power database 140. With the input of an additional power factor 10, power database generator 130 of the system power estimation infrastructure 100 may dynamically adjust and correctly reflect the power consumption at different status.

The characteristic extractor 110 inserted into the electronic device only informs the power database generator 130 of the power characteristic (such as the operating status of the electronic device) of the electronic device and will not interfere the operating of the electronic device, so the TLM of the electronic device does not need to rewrite. In the circumstance that the original design model content of the electronic device does not need to be modified, the system power estimation infrastructure 100 converts one TLM into the TLM with a power information reporting function by using the characteristic of the four-element, and thus all kinds of the power model may be flexibly used and the software and hardware system power simulation analysis, low power architecture exploration and strategy formulation of the dynamic power management may be proceeded at different time sequence levels. Moreover, the infrastructure conversion may be automated by using the high-level synthesis technique, which further reduces the cycle of the design and realizes the high-level power estimation in the early stage of the design.

Figure 3:
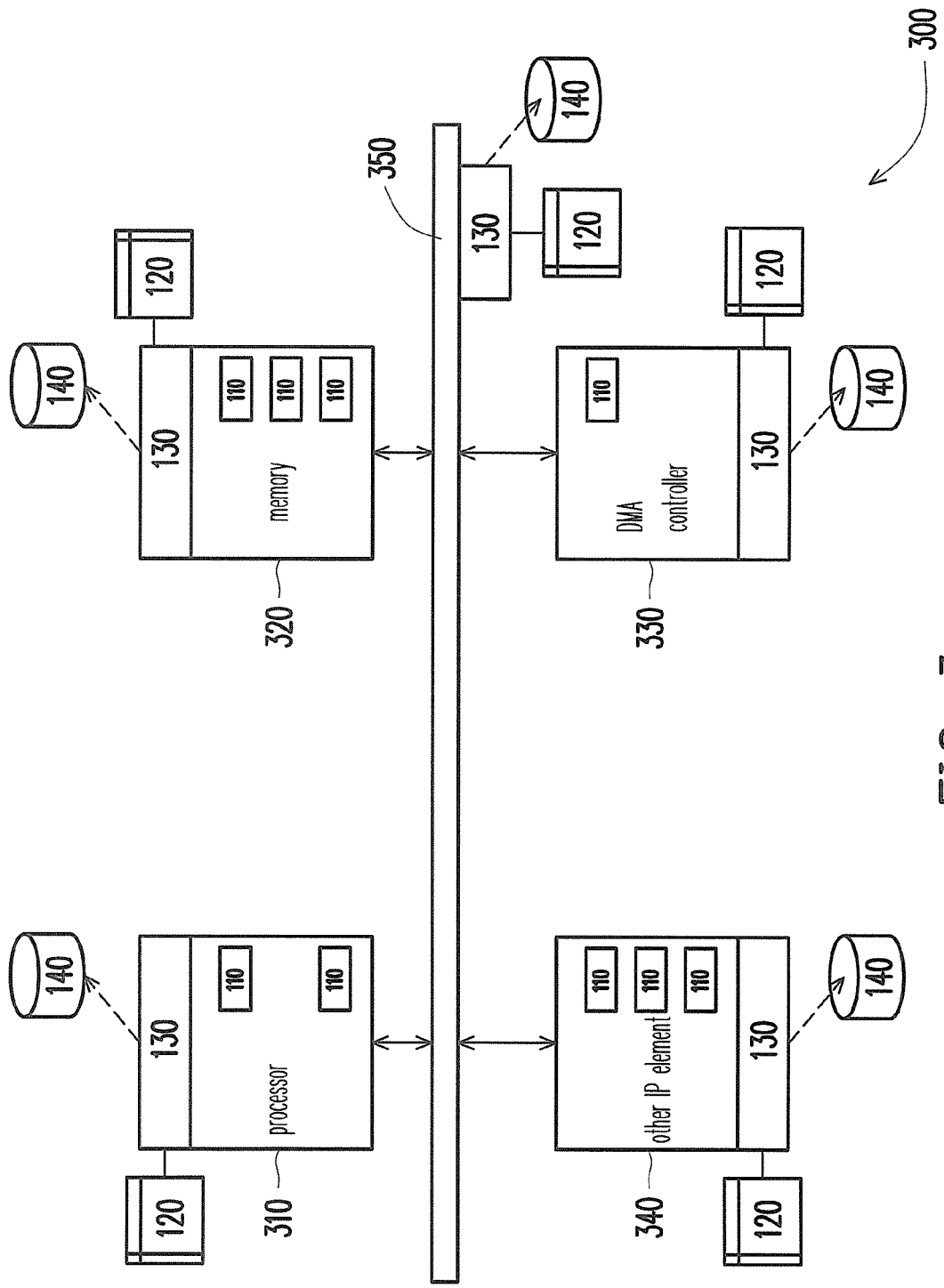
FIG. 3 is a schematic view illustrating a function module of a target system according to an embodiment of the disclosure.

The system power estimation infrastructure 100 may be applied the TLM of the target system of any form. For example, FIG. 3 is a schematic view illustrating a function module of a target system 300 according to an embodiment of the disclosure. Referring to FIG. 3, the target system 300 includes plural electronic devices such as a processor 310, a memory 320, a direct memory access (DMA) controller 330, other intellectual property (IP) element 340 and a bus 350. The processor 310 may be a central processing unit (CPU), a digital signal processor (DSP), a micro-controller or other processors/controllers. The processor 310, the memory 320, the DMA controller 330, the IP element 340 are communicated through the bus 350.

According to the description of the above embodiments, the system power estimation infrastructure 100 may be applied in the electronic device such as the processor 310, the memory 320, the DMA controller 330, the IP element 340 and the bus 350 in FIG. 3. After the corresponding characteristic extractor 110 is inserted into each electronic device, the characteristic extractor 110 may be connected with the power database generator 130 and the power model 120. In the course of simulation, the power database generator 130 of each electronic device in the target system 300 may automatically accept the power characteristic transferred by the respective characteristic extractor 110. The power database generators 130 together with the respective power model 120 and/or additional power factor 10 produces the respective power database 140, as shown in FIG. 1. The power consumption value recorded in the power database 140 of the electronic devices (e.g. the electronic devices 310, 320, 330, 340, 350 etc.) in the target system 300 are added to become the power consumption value of the whole target system 300. Therefore, the high-level power estimation of the whole target system may be realized in the design stage of the ESL.

Figure 4:
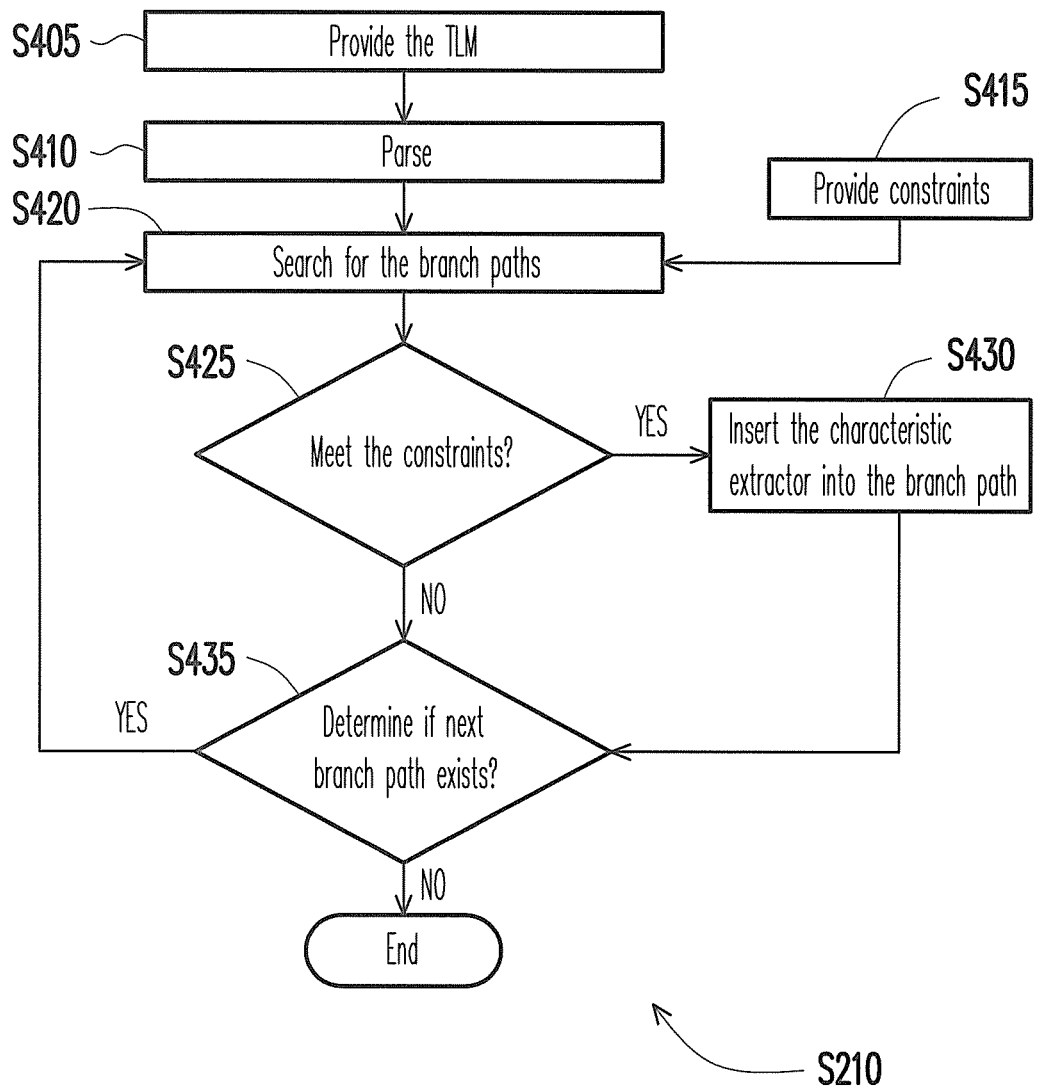
FIG. 4 is a flow schematic view illustrating a characteristic extractor inserting method according to an embodiment of the disclosure.

Herein, FIG. 4 illustrates the embodiment of step S210 in FIG. 2A. FIG. 4 is a flow chart illustrating a characteristic extractor 110 inserting method according to an embodiment of the disclosure. In step S405, the TLM of the electronic device (e.g. the processor 310) of the target system 300 is provided to the simulation platform. Hereinafter, the processor 310 is taken as an example for illustration; other electronic devices of target system 300 may refer to the relevant illustration of the processor 310.

The simulation platform is performing the step S410 to allow the TLM of the processor 310 proceeding the source level parsing to obtain the CDFG of the processor 310. On the other hand, in step S415, the preset constraints (e.g. the amount of the inserted characteristic extractor 110 set in advance) are provided to the simulation platform. Then, in step S420, according to the inserting constraint of step S415, the appropriate inserting positions (e.g. a start point of a branch path) are found in the processor 310. The constraint may be determined according to the intellectual property specification of the processor 310, or set by the user manually, or set according to a key status required by the design.

In step S425, it is determined if the currently found branch path meets the constraint. If the currently found branch path does not meet the constraint, the process goes to step S435 for determining if next branch path exists. In step S425, it is determined if the currently found branch path meets the constraint, step S430 is proceeded for inserting the characteristic extractor 110 into the currently found branch path. In step S435, it is determined if the unexamined branch path exists. If the unexamined branch path exists, the process returns to step S420 for finding out next branch path. If in step S435, it is determined that all the branch paths of the processor 310 are examined, the step S210 in FIG. 2A is completed.

Here, a part of pseudo codes of the TLM of the processor 310 are assumed as follows:

```
SC_MODULE(DSP)
{
  ......
  if (run_flag)
  {
        if(cache-miss_flag)
        {
              ......
        } else
        {
              ......
        }
```

```
} else if(config_flag)
{
    ......
} else
{                                       //idle
    ......
}
    ......
}
```

Figure 5:
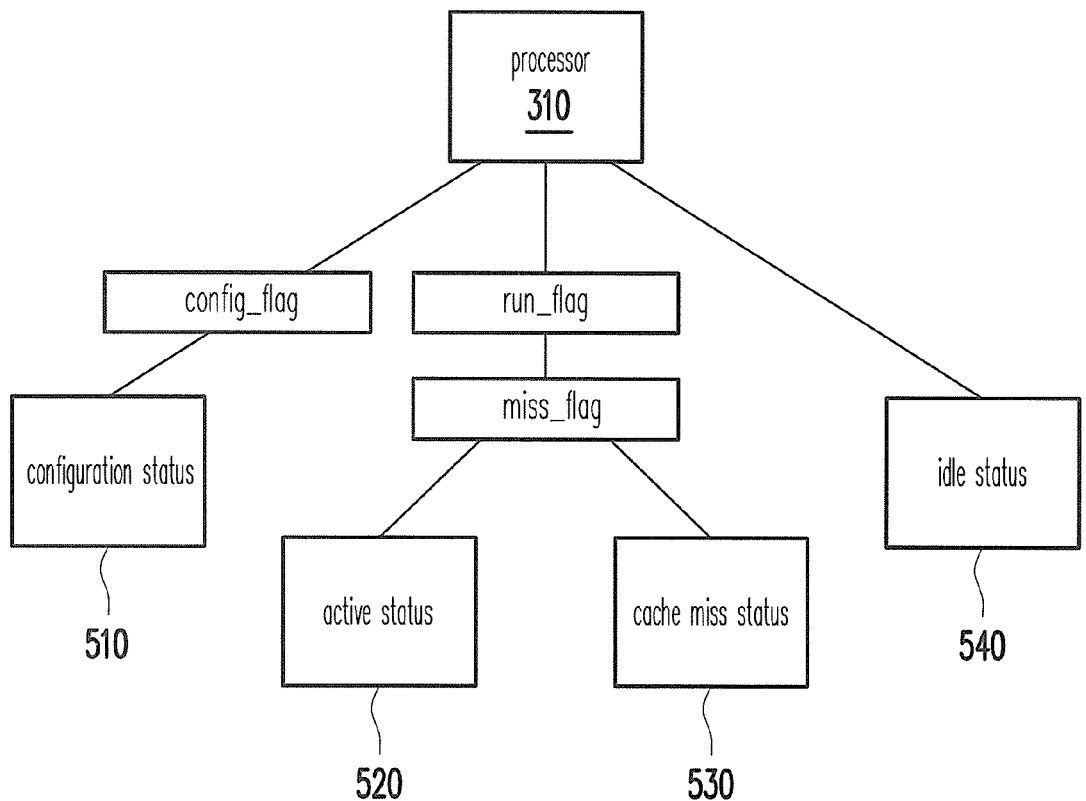
FIG. 5 is a schematic view illustrating an operation status of a processor in FIG. 3 according to an embodiment of the disclosure.

The pseudo code may represent the source code of the TLM of the processor 310. FIG. 5 is a schematic view illustrating an operation status of a processor 310 in FIG. 3 according to an embodiment of the disclosure. If the event run_flag does not stand and the event config_flag stands, the processor 310 enters a configuration status 510. If the event run_flag stands and the event cache-miss_flag does not stand, the processor 310 enters an active status 520. If the event run_flag and the event cache-miss_flag both stand, the processor 310 enters a cache miss status 530. If both the event run_flag and the event config_flag do not stand, the processor 310 enters an idle status 540. Therefore, after the TLM of the processor 310 is parsed in step S410, the processor 310 is known to have four branch paths including the configuration status 510, the active status 520, the cache miss status 530 and the idle status 540.

Here, the constraint in step S415 is assumed to be "all the branch paths," in step S430, a characteristic extractor 110 is inserted into the 4 branch paths including the configuration status 510, the active status 520, the cache miss status 530 and the idle status 540 respectively. A part of the pseudo codes of the TLM with the characteristic extractor 110 inserted are illustrated as follows:

```
SC_MODULE(DSP)
{
    PowerDatabaseGen DSP_PDG;        //link power database generator 130
    DSP_PDG(DSP_PowerModel);         //link power model 120
    ......
    if (run_flag)
    {
    if(cache-miss_flag)
    {
    DSP_PDG.PowerExtractor           //the first characteristic
    (Characteristic(Cache-miss));    extractor 110
    ......
    } else
    {
    DSP_PDG.PowerExtractor           //the second characteristic
    (Characteristic(Active));        extractor 110
    ......
    }
    } else if(config_flag)
    {
    DSP_PDG.PowerExtractor           //the third characteristic
    (Characteristic(Conf));          extractor 110
    ......
    } else
    {                                //idle
    DSP_PDG.PowerExtractor           //the fourth characteristic
    (Characteristic(Idle);           extractor 110
    ......
    }
    ......
}
```

Therefore, in step S220, the characteristic extractor 110 inserted into the processor 310 extract the power characteristic of the processor 310 during the TL simulation when the target system 300 is performing the TL simulation, that is, transfer the operating status currently proceeded by the processor 310 to the power database generator 130.

Figure 6:
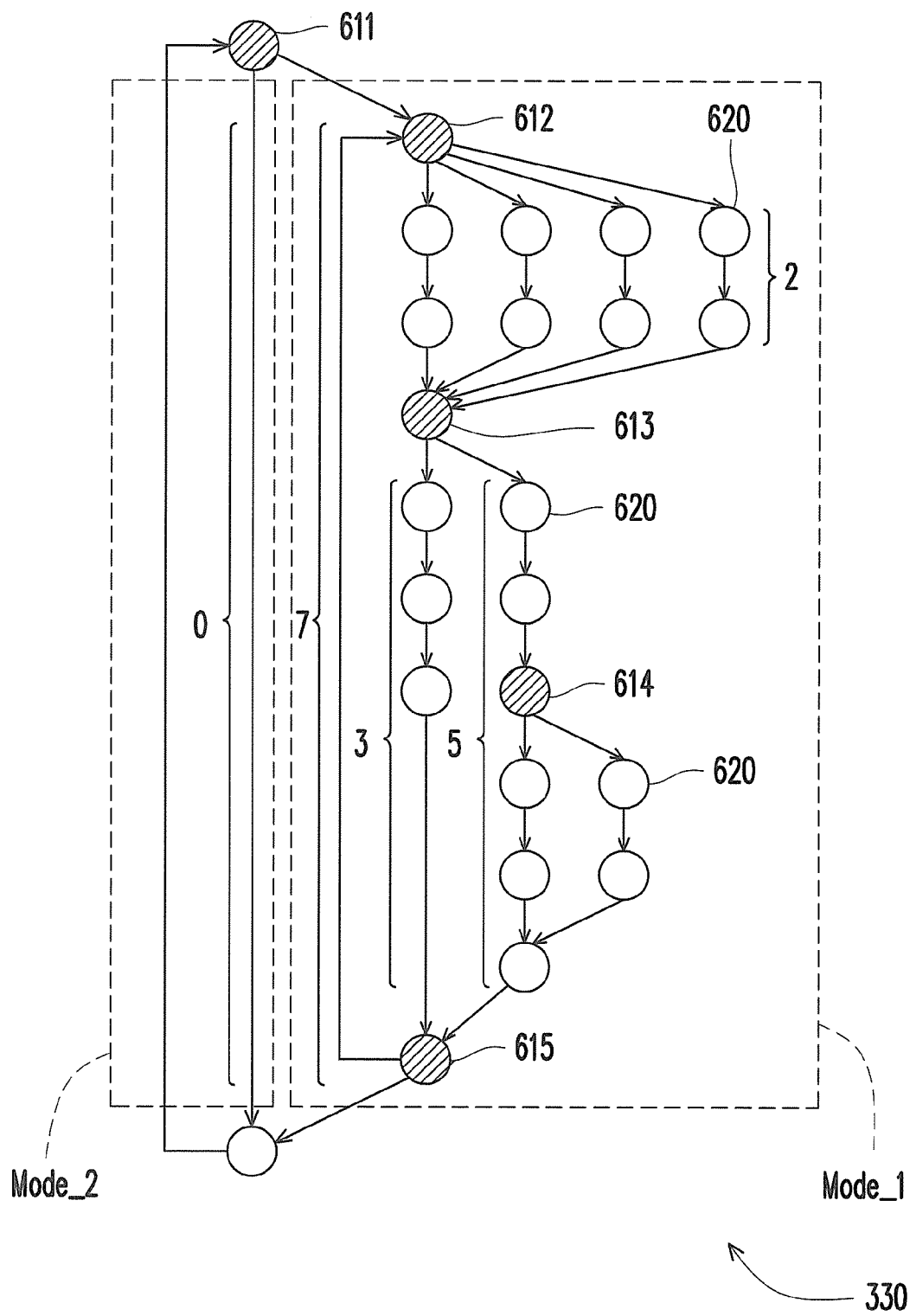
FIG. 6 is a control data flow graph (CDFG) illustrating a direct memory access controller in FIG. 3 according to an embodiment of the disclosure.

Here, the DMA controller 330 is taken as an example to illustrate another embodiment of step S210 in FIG. 2A. In the step of "finding out the branch path of the electronic device" in this embodiment, after the TLM of the electronic device (DMA controller 330) is parsed on the simulation platform, the CDFG of the DMA controller 330 is obtained. For example, FIG. 6 is a CDFG illustrating a DMA controller 330 in FIG. 3 according to an embodiment of the disclosure. In the figure, the graph with the slash background indicates branch points 611~615, and the hollow circle indicates the operand (operation action or operation instruction) 620. The DMA controller 330 enters one of the plural branch paths based on the determination of the branch point 611~615.

Then, the simulation platform finds out plural branch points of the DMA controller 330 from the CDFG. 5 branch points 611~615 are shown in FIG. 6, each branch point 611~615 has different numbers of the branch paths, and the paths respectively have one or plural operands 620 with different numbers.

Then, the simulation platform calculates an operand amount of each branch path of each branch point 611~615. For example, there are 4 branch paths between the branch point 612 to the branch point 613, and the branch paths respectively have 2 operands 620. Also, for example, the branch point 613 has 2 branch paths, in which the branch path from the branch point 613 to the branch point 615 has 3 operands 620, and the branch path from the branch point 613 to the branch point 615 via the branch point 614 has the longest path with 5 operands 620. Then, for example, the branch point 611 has 2 branch paths, which respectively have 0 and 7 operands 620, as shown in FIG. 6.

Then, the simulation platform calculates the operand amount difference of each branch point 611~615. The so-called operand amount difference refers to the difference of the operand number between the branch path with the most operand 620 and the branch path with the least operand 620 on the branch point. For example, 4 branch paths of the branch point 612 respectively have 2 operands 620, so the operand amount difference of the branch point 612 is 2−2=0. Also, for example, the branch point 613 has 2 branch paths, and the operand amount of the 2 branch paths is respectively 3 operands and 5 operands, so the operand amount difference of the branch point 613 is 5−3=2. Then, for example, the branch point 611 has 2 branch paths, and the operand amount of the 2 branch paths is respectively 0 operand and 7 operands, so the operand amount difference of the branch point 611 is 7−0=7.

Based on the calculated operand amount difference, at least a key branch point is selected from the branch points 611~615. Then, the characteristic extractor 110 is inserted into the branch path of at least a key branch point. The step of selecting at least a key branch point may be realized in any manner. For example, one threshold is defined, and then the branch point with the operand amount difference greater than and equal to the threshold is selected from the branch points 611~615 to serve as the at least a key branch point. For example, if the threshold is set to 2, the branch point 611 and the branch point 613 are selected to serve as the key branch point. If the threshold is set to 0, all the branch points 611~615 are selected to serve as the key branch point.

In this embodiment, in the step of selecting at least a key branch point, the branch point with the most operand amount difference may also be selected from the branch points 611~615 to serve as the at least a key branch point. For example, in FIG. 6, since the operand amount difference of the branch point 611 is the largest, the branch point 611 is selected to be the key branch point. Therefore, the simulation platform can automatically define the power modes according to the key branch points. That is to say, the power mode of the DMA controller 330 is divided into the idle status Mode_2 and the active status Mode_1 in this embodiment.

Here, a part of pseudo codes of the TLM of DMA controller 330 are assumed as follows:

```
SC_MODULE(DMA)
{
......
If(DMA_EN_Flag)
{
        ......
} else
{                       //idle
        ......
}
......
}
```

The pseudo code may represent the source code of the TLM of the DMA controller 330. If the event DMA_EN_Flag does not stand, the DMA controller 330 enters the idle status Mode_2. If the event DMA_EN_Flag stands, the DMA controller 330 enters the active status Mode_1. Since the branch point 611 is selected to be the key branch point, one characteristic extractor 110 is inserted into the 2 branch paths of the branch point 611 respectively. A part of the pseudo codes of the TLM after the characteristic extractor 110 is inserted are illustrated as follows:

```
SC_MODULE(DMA)
{
  PowerDatabaseGen DMA_PDG;      //link power database generator 130
  DMA_PDG(DMA_PowerModel);       //link power model 120
  ......
  If(DMA_EN_Flag)
  {
  ......
  DMA_PDG.PowerExtractor         //the first characteristic
  (Characteristic(Mode_1));      extractor 110
  ......
  } else
  {                              //idle
  ......
  DMA_PDG.PowerExtractor         //the second characteristic
  (Characteristic(Mode_2));      extractor 110
  ......
  }
  ......
}
```

Therefore, the characteristic extractor 110 inserted into the DMA controller 330 may extract the power characteristic of the DMA controller 330 during the TL simulation when the TL simulation of the target system 300 is performing, that is, transfer the operating status currently proceeded by the DMA controller 330 to the power database generator 130.

The power database generator 130 converts the power characteristic provided from the characteristic extractor 110 to the power consumption value by using the power model 120. In this embodiment, the power model 120 includes a look-up table. The look-up table includes a mode field, a dynamic power coefficient field and/or a static power coefficient field. For example, the power model 120 of the DMA controller 330 may include the look-up table of Table 1.

TABLE 1

Power model 120 of the DMA controller 330

| MODE | DYNAMIC POWER COEFFICIENT | STATIC POWER COEFFICIENT |
| --- | --- | --- |
| Active Status Mode_1 | 0.00006683 | 0.00533 |
| Idle Status Mode_2 | 0.00005995 | 0.00532 |

In step S230, the power database generator 130 of the DMA controller 330 obtains the power characteristic (here, the operating status/mode) of the DMA controller 330 from the characteristic extractor 110 of the DMA controller 330. Based on the current operating status/mode provided from the characteristic extractor 110, the power database generator 130 may search the mode field from the power model 120 (the look-up table of Table 1) of the DMA controller 330 to obtain the corresponding dynamic power coefficient field value and the static power coefficient field value form the look-up table. The dynamic power coefficient field value may be a dynamic energy coefficient or a dynamic current coefficient. If the dynamic power coefficient field value is the dynamic energy coefficient, the power database generator 130 may calculate the dynamic power value of the DMA controller 330 in the current operating status/mode to be the dynamic power value=dynamic energy coefficient×clock frequency, in which the clock frequency is the operating frequency of the DMA controller 330. If the dynamic power coefficient field value is the dynamic current coefficient, the power database generator 130 may calculate the dynamic power value of the DMA controller 330 in the current operating status/mode to be the dynamic power value=dynamic current coefficient×voltage value×clock frequency. The static power coefficient field value may directly be the static power value or the static current coefficient. If the static power coefficient field value is the static current coefficient, the power database generator 130 may calculate the static power value of the DMA controller 330 in the current operating status/mode to be the static power value=static current coefficient×voltage value, in which the voltage value is the operating voltage (e.g. operating voltage VDD provided by the "power factor 10" in FIG. 1) of the DMA controller 330. The dynamic power value and the static power value serving as the clock frequency are taken as the power consumption value of the DMA controller 330. Then, the power database generator 130 may write the identification code, the current operating status/mode, the static power, the dynamic power and the corresponding time stamp of the DMA controller 330 into the power database 140.

Also, for example, if the target system 300 has the dynamic power management function, the look-up table of the power model 120 of the processor 310 at least has the power factor field, the mode field and the power coefficient field, in which the content of the power factor field is corresponding to the power factor 10 in FIG. 1, and the power coefficient field includes the dynamic power coefficient field and/or the static power coefficient field. For example, the look-up table of Table 2 includes an operating voltage field (i.e. the power factor field), a mode field, a dynamic power coefficient field and a static power coefficient field. As compared with Table 1, the different operating voltage field of the processor 310 is added in Table 2.

TABLE 2

Power model 120 of the processor 310

| OPERATING VOLTAGE | MODE | DYNAMIC POWER COEFFICIENT | STATIC POWER COEFFICIENT |
|---|---|---|---|
| 0.8 V | configuration status 510 | 0.0001175 | 0.0181 |
| 0.8 V | active status 520 | 0.0001313 | 0.0271 |
| 0.8 V | cache miss status 530 | 0.0000875 | 0.0269 |
| 0.8 V | idle status 540 | 0.0001168 | 0.0175 |
| 0.9 V | configuration status 510 | ... | ... |
| ... | ... | ... | |

In step S230, the power database generator 130 of the processor 310 obtains the power characteristic (the operating status/mode) and the power factor 10 (the operating voltage) received during simulation of the processor 310 from the characteristic extractor 110 of the processor 310. Based on the current operating status/mode provided from characteristic extractor 110 and the power factor 10 provided from the operating voltage, the power database generator 130 may search the operating voltage field (i.e. the power factor field) and the mode field from the power model 120 (as shown in Table 2) of the processor 310 to obtain the corresponding dynamic power coefficient field value and the static power coefficient field value from the look-up table. The dynamic power coefficient field value may be a dynamic energy coefficient or a dynamic current coefficient. If the dynamic power coefficient field value is the dynamic energy coefficient, the power database generator 130 may calculate the dynamic power of the processor 310 in the current operating status/mode to be the dynamic power=dynamic energy coefficient× clock frequency, in which the clock frequency is the operating frequency of the processor 310. If the dynamic power coefficient field value is the dynamic current coefficient, the power database generator 130 may calculate the dynamic power value of the processor 310 in the current operating status/mode to be the dynamic power value=dynamic current coefficient×voltage value×clock frequency. The static power coefficient field value may directly be the static power value or the static current coefficient. If the static power coefficient field value is the static current coefficient, the power database generator 130 may calculate the static power value of the DMA controller 330 in the current operating status/mode to be the static power value=static current coefficient×voltage value, in which the voltage value is the operating voltage (provided by the "power factor 10" in FIG. 1) of the processor 310. The power database generator 130 may write the identification code, the current operating status/mode, the static power, the dynamic power and the corresponding time stamp of the processor 310 into the power database 140.

The database generator 130 of the electronic devices such as the processor 310, the memory 320, the DMA controller 330, other IP elements 340 and the bus 350 may calculate the respective static power and/or dynamic power during the TL simulation. Then, the database generator 130 may write the identification code, the current operating status/mode, the static power, the dynamic power and the corresponding time stamp of each electronic device into the power database 140. The application of the embodiment may realize the power database 140 in any data structure. For example, the power database 140 may include the mode field, the time stamp field and the power consumption value field. The power consumption value field may include the dynamic power field and/or the static power field. Table 3 illustrates the example content of the power database 140 of the target system 300, in which the identification code "1" indicates the memory 320.

TABLE 3

Content of the power database 140 of the target system 300

| IDENTIFICATION CODE | TIME STAMP | DYNAMIC POWER | STATIC POWER | MODE |
|---|---|---|---|---|
| 1 | 0 | 0 | 0.00082 | idle status |
| 1 | 0 | 0.053880 | 0.003786 | writing status |
| 1 | 570118 ns | 0.029722 | 0.001438 | reading status |
| 1 | 670251 ns | 0.037472 | 0.001438 | reading status |
| ... | ... | ... | ... | ... |

In the embodiment, the characteristic extractor 110 is inserted into the electronic device of the target system 300, so that the characteristic extractor 110 may extract a power characteristic of the electronic device when the TL simulation of the target system 300 is performing. The power database generator 130 converts the power characteristic output by the characteristic extractor 110 during the TL simulation to the power consumption value by using the power model 120 corresponding to the electronic device. Therefore, the high-level power estimation is realized in the design stage of the ESL, thus it can be used to minimizing power consumption at early design stage to obtain better power saving. The experimental data shows that the power estimation method of the above embodiments may achieve the above 90% accuracy.

The power database generator 130 of the above embodiments may support the dynamic power management (DPM). If the system 300 uses a certain controller (e.g. the power management unit (PMU)) to dynamically control the clock frequency, the operating voltage and the power operating mode (such as the active mode and the sleeping mode), the certain controller may input the relevant information (i.e. the power factor 10) of the dynamic power management to the power database generator 130. The major function of the power database generator 130 is to collect the necessary information in the TL simulation and convert the information to the power consumption value. Therefore, the power database generator 130 may dynamically adjust and correctly reflect the power consumption in different status.

The above embodiments may be realized by hardware. Those skilled in the art may realize the above embodiments in the form of the computer program with reference to the illustration of the embodiments and uses the computer readable storage medium to store the computer program, for facilitating the computer to execute the characteristic extractor 110 inserting method and execute the system power estimation method of the above embodiments. Or, some components of the above embodiments are realized by hardware and other components are realized by software. The hardware and the software collaboratively operate to realize the system power estimation method.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A transaction level (TL) system power estimation method, comprising:
    inserting at least a characteristic extractor not belonging to at least an electronic device of a target system into the electronic device;
    performing a TL simulation of the target system, wherein the at least a characteristic extractor extracts at least a power characteristic of the electronic device when the TL simulation is performing;
    providing a power model;
    converting, using a computer, the at least a power characteristic provided from the at least a characteristic extractor to at least a power consumption value by using the power model; and
    recording the at least a power consumption value into a power database.

2. The TL system power estimation method according to claim 1, wherein the step of inserting at least a characteristic extractor comprises:
    parsing a transaction level model (TLM) of the electronic device to find out a branch path of an operation status of the electronic device; and
    inserting the at least a characteristic extractor into the branch path.

3. The TL system power estimation method according to claim 1, wherein the step of inserting at least a characteristic extractor comprises:
    parsing a transaction level model (TLM) of the electronic device to find out plural branch points of operation statuses of the electronic device, wherein each of the branch points has plural branch paths;
    calculating an operand amount of each branch path of each branch point;
    calculating an operand amount difference of each branch point;
    selecting at least a key branch point from the branch points based on the operand amount difference; and
    inserting the at least a characteristic extractor into the branch path of the at least a key branch point.

4. The TL system power estimation method according to claim 3, wherein the step of selecting at least a key branch point comprises:
    selecting the branch point with the most operand amount difference from the branch points to serve as the at least a key branch point.

5. The TL system power estimation method according to claim 3, wherein the step of selecting at least a key branch point comprises:
    defining a threshold; and
    selecting the branch point with the operand amount difference greater than the threshold from the branch points to serve as the at least a key branch point.

6. The TL system power estimation method according to claim 1, wherein the at least a power characteristic comprises a time stamp and/or a status information.

7. The TL system power estimation method according to claim 1, wherein the power model provides a coefficient value and/or a calculation formula for calculating the at least a power consumption value.

8. The TL system power estimation method according to claim 1, wherein the power model comprises a look-up table, the look-up table comprises a mode field and a dynamic power coefficient field, and the step of converting the at least a power characteristic to at least a power consumption value comprises:
    searching the mode field of the look-up table based on the at least a power characteristic to obtain a corresponding dynamic power coefficient field value; and
    multiplying the dynamic power coefficient field value by a clock frequency and/or an operating voltage of the electronic device to obtain a dynamic power value of the electronic device to serve as the at least a power consumption value.

9. The TL system power estimation method according to claim 1, wherein the power model comprises a look-up table, the look-up table comprises a mode field and a static power coefficient field, and the step of converting the at least a power characteristic to at least a power consumption value comprises:
    searching the mode field of the look-up table based on the at least a power characteristic to obtain a corresponding static power coefficient field value; and
    making the static power coefficient field value to serve as the at least a power consumption value or multiplying the static power coefficient field value by an operating voltage of the electronic device to serve as the at least a power consumption value.

10. The TL system power estimation method according to claim 1, wherein the power model comprises a look-up table, the look-up table comprises a mode field, a dynamic power coefficient field and a static power coefficient field, and the step of converting the at least a power characteristic to at least a power consumption value comprises:
    searching the mode field of the look-up table based on the at least a power characteristic to obtain a corresponding dynamic power coefficient field value and a corresponding static power coefficient field value;
    multiplying the dynamic power coefficient field value by a clock frequency and/or an operating voltage of the electronic device to obtain a dynamic power value of the electronic device; and
    making the static power coefficient field value and the dynamic power value to serve as the at least a power consumption value, or making the dynamic power value and a result multiplied the static power coefficient field value by the operating voltage of the electronic device to serve as the at least a power consumption value.

11. The TL system power estimation method according to claim 1, wherein the power model comprises a look-up table, the look-up table comprises a power factor field, a mode field and a dynamic power coefficient field, and the step of converting the at least a power characteristic to at least a power consumption value comprises:
    searching the power factor field of the look-up table based on a power factor of the dynamic power management, and searching the mode field of the look-up table based on the at least a power characteristic to obtain a corresponding dynamic power coefficient field value; and
    multiplying the dynamic power coefficient field value by a clock frequency and/or an operating voltage of the electronic device to obtain a dynamic power value of the electronic device to serve as the at least a power consumption value.

12. The TL system power estimation method according to claim 1, wherein the power model comprises a look-up table, the look-up table comprises a power factor field, a mode field and a static power coefficient field, and the step of converting the at least a power characteristic to at least a power consumption value comprises:
    searching the power factor field of the look-up table based on a power factor of the dynamic power management, and searching the mode field of the look-up table based on the at least a power characteristic to obtain a corresponding static power coefficient field value; and making the static power coefficient field value to serve as the at least a power consumption value or multiplying the static power coefficient field value by an operating voltage of the electronic device to serve as the at least a power consumption value.

13. The TL system power estimation method according to claim 1, wherein the power model comprises a look-up table, the look-up table comprises a power factor field, a mode field, a dynamic power coefficient field and a static power coefficient field, and the step of converting the at least a power characteristic to at least a power consumption value comprises:

searching the power factor field of the look-up table based on a power factor of the dynamic power management, and searching the mode field of the look-up table based on the at least a power characteristic to obtain a corresponding dynamic power coefficient field value and a corresponding static power coefficient field value;

multiplying the dynamic power coefficient field value by a clock frequency and/or an operating voltage of the electronic device to obtain a dynamic power value of the electronic device; and making the static power coefficient field value and the dynamic power value to serve as the at least a power consumption value, or making the dynamic power value and a result multiplied the static power coefficient field value by the operating voltage of the electronic device to serve as the at least a power consumption value.

14. The TL system power estimation method according to claim 1, wherein the power database comprises a mode field, a time stamp field and a power consumption value field.

15. The TL system power estimation method according to claim 1, wherein the step of providing a power model comprises:

proceeding a control data flow graph (CDFG) analysis function on the electronic device by a high-level synthesizer;

proceeding a power profiling function on the electronic device by the high-level synthesizer, wherein the power profiling function obtains power information of plural branch paths in the CDFG of the electronic device in a low-level simulation manner based on an analysis result of the CDFG analysis function; and creating the power model by using the power information of plural branch paths.

16. A non-transitory computer readable recording medium, for storing a program that executes the transaction level system power estimation method according to claim 1.

17. A system power estimation system, comprising:

at least a characteristic extractor, not belonging to at least an electronic device of a target system, and inserted into the electronic device;

a simulation platform, performing a transaction level (TL) simulation of the target system, wherein the at least a characteristic extractor extracts at least a power characteristic of the electronic device when the TL simulation is performing;

at least a power model, recording a power consumption model of the electronic device;

a power database generator, using the power model to convert the at least a power characteristic provided from the at least a characteristic extractor to at least a power consumption value; and a power database, recording the at least a power consumption value output by the power database generator.

18. The system power estimation system according to claim 17, wherein the simulation platform parses a transaction level model (TLM) of the electronic device to find out a branch path of an operation status of the electronic device; and the simulation platform inserts the at least a characteristic extractor into the branch path.

19. The system power estimation system according to claim 17, wherein the simulation platform parses a TLM of the electronic device to find out plural branch points of operation statuses of the electronic device, and each of the branch points has single or plural branch paths; the simulation platform calculates an operand amount of each branch path of each branch point; the simulation platform calculates the operand amount differences of each branch point; the simulation platform selects at least a key branch point from the branch points based on the operand amount differences; and the simulation platform inserts the at least a characteristic extractor into the branch path of the at least a key branch point.

20. The system power estimation system according to claim 19, wherein the simulation platform selects the branch point with the most operand amount difference from the branch points to serve as the at least a key branch point.

21. The system power estimation system according to claim 19, wherein the simulation platform selects the branch point with the operand amount difference greater than a threshold from the branch points to serve as the at least a key branch point.

22. The system power estimation system according to claim 17, wherein the at least a power characteristic comprises a time stamp and/or a status information.

23. The system power estimation system according to claim 17, wherein the power model provides a coefficient value and/or a calculation formula for calculating the at least a power consumption value.

24. The system power estimation system according to claim 17, wherein the power model comprises a look-up table, the look-up table comprises a mode field and a dynamic power coefficient field; the power database generator searches the mode field of the look-up table based on the at least a power characteristic to obtain a corresponding dynamic power coefficient field value; and the power database generator multiplies the dynamic power coefficient field value by a clock frequency and/or an operating voltage of the electronic device to obtain a dynamic power value of the electronic device to serve as the at least a power consumption value.

25. The system power estimation system according to claim 17, wherein the power model comprises a look-up table, the look-up table comprises a mode field and a static power coefficient field; the power database generator searches the mode field of the look-up table based on the at least a power characteristic to obtain a corresponding static power coefficient field value; and the power database generator makes the static power coefficient field value to serve as the at least a power consumption value or multiplies the static power coefficient field value by an operating voltage of the electronic device to serve as the at least a power consumption value.

26. The system power estimation system according to claim 17, wherein the power model comprises a look-up table, the look-up table comprises a mode field, a dynamic power coefficient field and a static power coefficient field; the power database generator searches the mode field of the look-up table based on the at least a power characteristic to obtain a corresponding dynamic power coefficient field value and a corresponding static power coefficient field value; the power database generator multiplies the dynamic power coefficient field value by a clock frequency and/or an operating voltage of the electronic device to obtain a dynamic power value of the electronic device; and the power database generator makes the static power coefficient field value and the dynamic power value to serve as the at least a power consumption value, or makes the dynamic power value and a result multiplied the static power coefficient field value by the operating voltage of the electronic device to serve as the at least a power consumption value.

27. The system power estimation system according to claim 17, wherein the power model comprises a look-up table, the look-up table comprises a power factor field, a mode field and a dynamic power coefficient field; the power database generator searches the power factor field of the look-up table based on a power factor of the dynamic power management, and searches the mode field of the look-up table based on the at least a power characteristic to obtain a corresponding dynamic power coefficient field value; and the power database generator multiplies the dynamic power coefficient field value by a clock frequency and/or an operating voltage of the electronic device to obtain a dynamic power value of the electronic device to serve as the at least a power consumption value.

28. The system power estimation system according to claim 17, wherein the power model comprises a look-up table, the look-up table comprises a power factor field, a mode field and a static power coefficient field; the power database generator searches the power factor field of the look-up table based on a power factor of the dynamic power management, and searches the mode field of the look-up table based on the at least a power characteristic to obtain a corresponding static power coefficient field value; and the power database generator makes the static power coefficient field value to serve as the at least a power consumption value or multiplies the static power coefficient field value by an operating voltage of the electronic device to serve as the at least a power consumption value.

29. The system power estimation system according to claim 17, wherein the power model comprises a look-up table, the look-up table comprises a power factor field, a mode field, a dynamic power coefficient field and a static power coefficient field; the power database generator searches the power factor field of the look-up table based on a power factor of the dynamic power management, and searches the mode field of the look-up table based on the at least a power characteristic to obtain a corresponding dynamic power coefficient field value and a corresponding static power coefficient field value; the power database generator multiplies the dynamic power coefficient field value by a clock frequency and/or an operating voltage of the electronic device to obtain a dynamic power value of the electronic device; and the power database generator makes the static power coefficient field value and the dynamic power value to serve as the at least a power consumption value, or makes the dynamic power value and a result multiplied the static power coefficient field value by the operating voltage of the electronic device to serve as the at least a power consumption value.

30. The system power estimation system according to claim 17, wherein the power database comprises a mode field, a time stamp field and a power consumption value field.

* * * * *